(12) United States Patent
Park et al.

(10) Patent No.: US 11,342,627 B2
(45) Date of Patent: May 24, 2022

(54) METHOD OF MANUFACTURING A BATTERY MODULE

(71) Applicant: LG Chem, Ltd., Seoul (KR)

(72) Inventors: Eun Suk Park, Daejeon (KR); Yoon Gyung Cho, Daejeon (KR); Sang Min Park, Daejeon (KR); Se Woo Yang, Daejeon (KR); Jae Hun Yang, Daejeon (KR); Kyung Su Oh, Daejeon (KR); Jae Min Lee, Daejeon (KR); Young Gil Kim, Daejeon (KR); Gyu Jong Bae, Daejeon (KR); Kyoung Bin Im, Daejeon (KR)

(73) Assignee: LG Energy Solution, Ltd.

( * ) Notice: Subject to any disclaimer, the term of this patent is extended or adjusted under 35 U.S.C. 154(b) by 309 days.

(21) Appl. No.: 16/552,525

(22) Filed: Aug. 27, 2019

(65) Prior Publication Data

US 2020/0144573 A1 May 7, 2020

Related U.S. Application Data

(62) Division of application No. 16/081,150, filed as application No. PCT/KR2017/003612 on Apr. 3, 2017, now Pat. No. 10,998,598.

(30) Foreign Application Priority Data

Apr. 1, 2016 (KR) .......................... 10-2016-0040363

(51) Int. Cl.
*H01M 10/658* (2014.01)
*H01M 10/653* (2014.01)
(Continued)

(52) U.S. Cl.
CPC ............... *H01M 50/24* (2021.01); *C08K 3/22* (2013.01); *C08K 5/0066* (2013.01); *C08K 5/49* (2013.01);
(Continued)

(58) Field of Classification Search
CPC ........ C08K 5/49; C08K 5/0066; H01M 50/20; H01M 50/24; H01M 50/116; H01M 10/653
See application file for complete search history.

(56) References Cited

U.S. PATENT DOCUMENTS 6,275,003 B1  8/2001  Marukawa et al.
9,156,978 B1  10/2015  Cai et al.
(Continued)

FOREIGN PATENT DOCUMENTS

EP  0747424 A1  12/1996
EP  2915845 A1  9/2015
(Continued)

OTHER PUBLICATIONS

International Search Report from PCT/KR2017/003612, dated Jun. 27, 2017.
(Continued)

*Primary Examiner* — Imran Akram
(74) *Attorney, Agent, or Firm* — Lerner, David, Littenberg, Krumholz & Mentlik, LLP

(57) ABSTRACT

The present application can provide a battery module, a manufacturing method thereof, and a resin composition applied to the manufacturing method. The present application can provide a battery module having excellent power relative to volume, while being manufactured in a simple process and at a low cost, a manufacturing method thereof, and a resin composition applied to the manufacturing method.

15 Claims, 5 Drawing Sheets

(51) Int. Cl.
    *C08K 5/00*         (2006.01)
    *C08K 5/49*         (2006.01)
    *C08K 3/22*         (2006.01)
    *C08K 5/523*       (2006.01)
    *C08K 13/02*       (2006.01)
    *C09K 21/12*       (2006.01)
    *H01M 10/0525*    (2010.01)
    *H01M 50/24*      (2021.01)
    *H01M 50/20*      (2021.01)

(52) U.S. Cl.
    CPC .............. *C08K 5/523* (2013.01); *C08K 13/02* (2013.01); *C09K 21/12* (2013.01); *H01M 10/0525* (2013.01); *H01M 10/653* (2015.04); *H01M 10/658* (2015.04); *H01M 50/20* (2021.01); *C08K 2003/2227* (2013.01)

(56) References Cited

U.S. PATENT DOCUMENTS

| | | | |
|---|---|---|---|
| 2002/0155348 A1 | 10/2002 | Gitto | |
| 2006/0046139 A1* | 3/2006 | Suzuki | H01M 10/0436 429/185 |
| 2006/0166089 A1* | 7/2006 | Suzuki | H01M 50/209 429/185 |
| 2009/0098417 A1* | 4/2009 | Yamada | H01M 50/557 29/623.2 |
| 2010/0040947 A1* | 2/2010 | Sennami | H01M 50/116 429/178 |
| 2010/0047681 A1* | 2/2010 | Mitsui | H01M 10/647 29/623.2 |
| 2010/0143788 A1* | 6/2010 | Koh | H01M 50/147 429/163 |
| 2011/0090614 A1 | 4/2011 | Guerin et al. | |
| 2011/0195291 A1 | 8/2011 | Yokoyama et al. | |
| 2011/0250475 A1 | 10/2011 | Yamamoto et al. | |
| 2011/0305948 A1 | 12/2011 | Miyatake et al. | |
| 2012/0074036 A1 | 3/2012 | Eckel et al. | |
| 2012/0171529 A1 | 7/2012 | Sugita et al. | |
| 2013/0052512 A1* | 2/2013 | Moriuchi | H01M 50/553 429/158 |
| 2013/0071696 A1 | 3/2013 | Kim et al. | |
| 2013/0109792 A1 | 5/2013 | Hoerold et al. | |
| 2013/0131258 A1 | 5/2013 | Kwon et al. | |
| 2013/0143095 A1* | 6/2013 | Takagi | H01M 50/449 429/144 |
| 2015/0315818 A1 | 11/2015 | Shen | |
| 2016/0181576 A1 | 6/2016 | Zouta et al. | |
| 2017/0301905 A1 | 10/2017 | Takeda et al. | |
| 2018/0076493 A1 | 3/2018 | Park et al. | |

FOREIGN PATENT DOCUMENTS

| | | |
|---|---|---|
| EP | 3264492 A1 | 1/2018 |
| JP | 2000108687 A | 4/2000 |
| JP | 200554155 A | 3/2005 |
| JP | 2005310449 A | 11/2005 |
| JP | 2013531117 A | 8/2013 |
| JP | 2013-231166 A | 11/2013 |
| JP | 2013-241524 A | 12/2013 |
| JP | 2014103123 A | 6/2014 |
| JP | 2018510463 A | 4/2018 |
| KR | 2010-0100943 A | 9/2010 |
| KR | 2013-0102077 A | 9/2013 |
| KR | 20150025236 A | 3/2015 |
| KR | 20150067863 A | 6/2015 |
| WO | 2016137303 A1 | 9/2016 |

OTHER PUBLICATIONS

Schmitt, et al., "Phosphorous-Based Flame Retardants for Thermoplastics", Plastics, Additives and Compounding, vol. 9, No. 3, May 2007, pp. 26-30.

Extended European Search Report and Written Opinion for EP Application No. 17775933.9, dated Feb. 11, 2019.

* cited by examiner

[Figure 1]
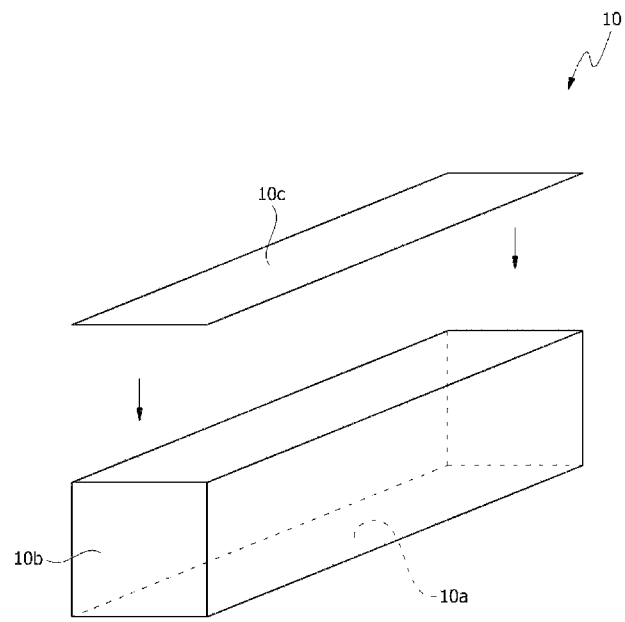
[Figure 2]
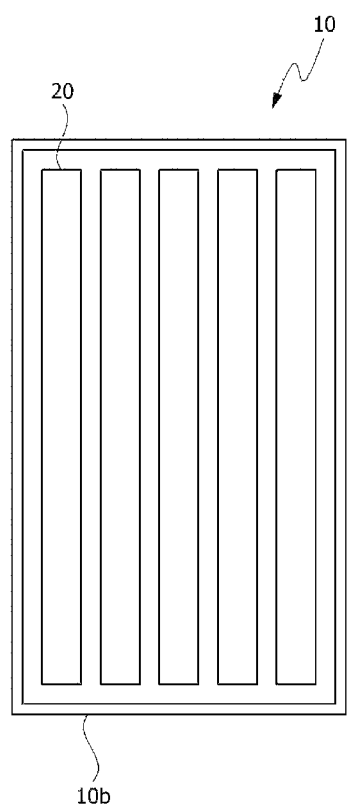

[Figure 3]
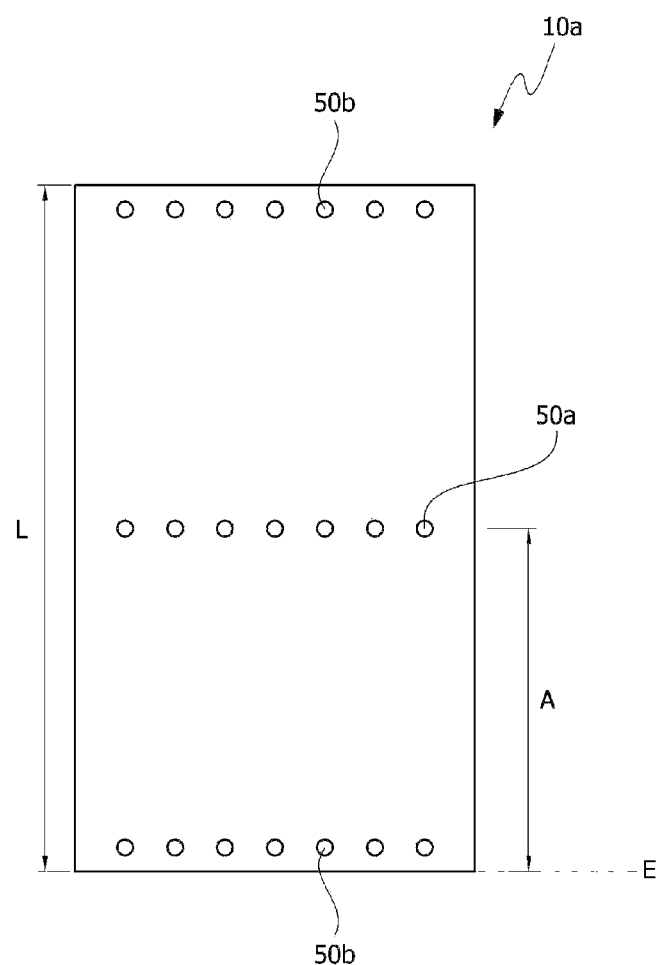

[Figure 4]
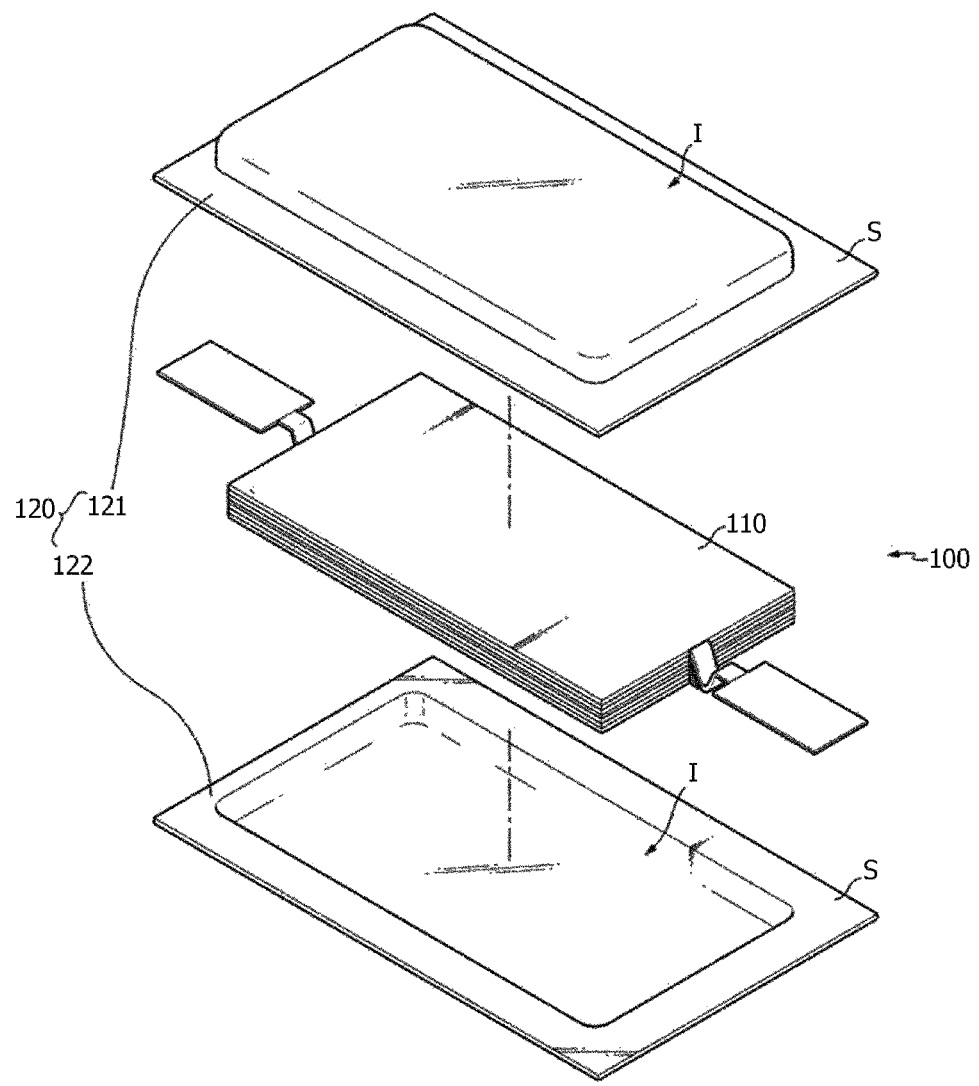

[Figure 5]
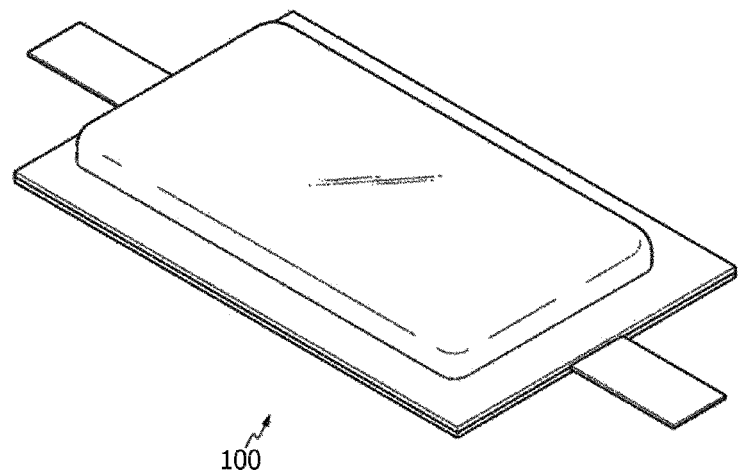
[Figure 6]
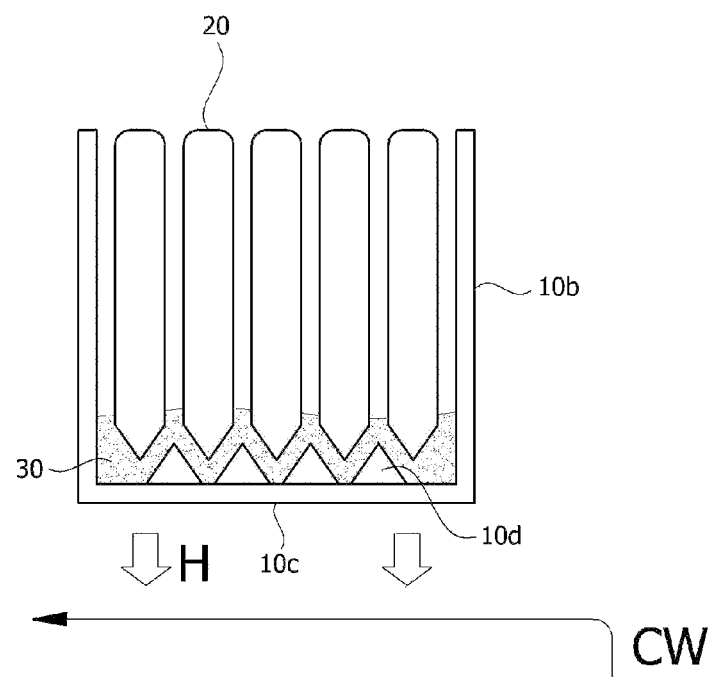

[Figure 7]
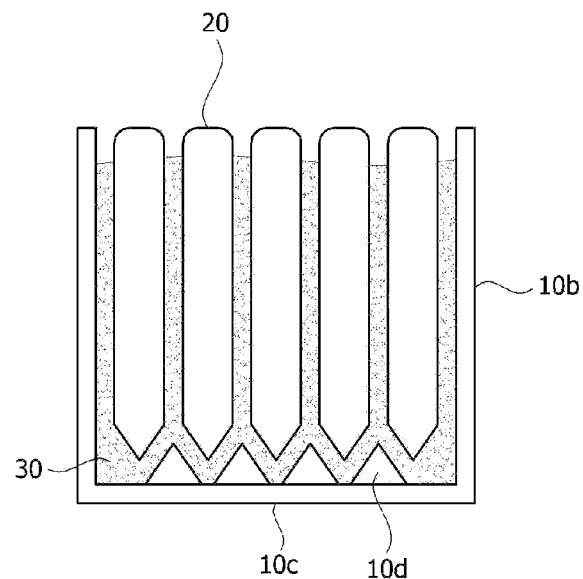
[Figure 8]
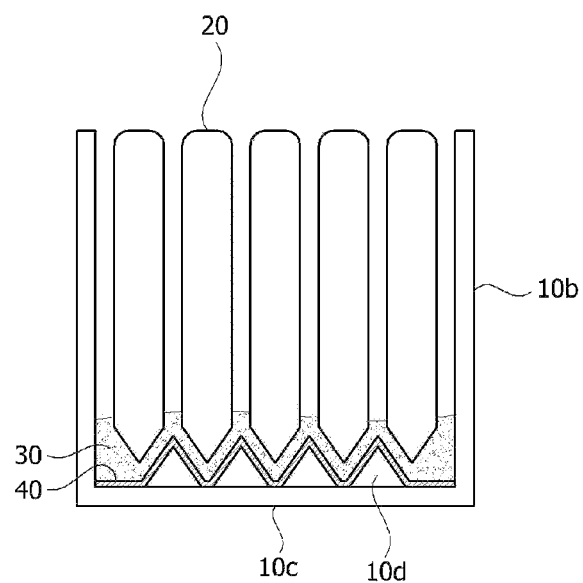

METHOD OF MANUFACTURING A BATTERY MODULE

CROSS-REFERENCE TO RELATED APPLICATIONS

This application is a divisional of U.S. application Ser. No. 16/081,150, filed Aug. 30, 2018, which is a national phase entry under 35 U.S.C. § 371 of International Application No. PCT/KR2017/003612, filed Apr. 3, 2017, which claims the benefit of priority based on Korean Patent Application No. 10-2016-0040363 filed, Apr. 1, 2016, the disclosure of which is incorporated herein by reference in its entirety.

TECHNICAL FIELD

The present application relates to a battery module.

BACKGROUND ART

The secondary battery includes a nickel cadmium battery, a nickel hydride battery, a nickel zinc battery, or a lithium secondary battery, and the like, where a typical example thereof is a lithium secondary battery.

The lithium secondary battery mainly uses lithium oxides and carbon materials as a positive electrode active material and a negative electrode active material, respectively. The lithium secondary battery includes an electrode assembly in which a positive plate and a negative plate coated with a positive electrode active material and a negative electrode active material, respectively, are disposed with a separator interposed therebetween, and an exterior material in which the electrode assembly is sealed and housed together with an electrolyte, which can be classified as a can type secondary battery and a pouch type secondary battery depending on the kind of the exterior material. In this specification, a single secondary battery can be referred to as a battery cell.

When used in medium and large devices such as automobiles or energy storage systems, to increase capacity and power, a large number of battery cells may be electrically connected to each other to constitute a battery module or a battery pack.

In order to construct the battery module or the battery pack in which a plurality of such battery modules is connected, various fastening parts, cooling equipments, and the like are required, where such fastening parts or cooling equipments, and the like cause an increase in the manufacturing cost of the battery module or the battery pack, increase volume and weight, and also reduce the power relative to the increased volume and weight.

DISCLOSURE

Technical Problem

The present application can provide a battery module.

Technical Solution

The battery module of the present application comprises a module case and a battery cell. The battery cell may be housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. The module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, and the type and number of the battery cell housed in the internal space, and the like.

FIG. 1 is a view showing an exemplary module case (10), which is an example of a box-shaped case (10) comprising one bottom plate (10a) and four sidewalls (10b). The module case (10) may further comprise a top plate (10c) sealing the internal space.

FIG. 2 is a schematic view of the module case (10) of FIG. 1, as observed from above, in which the battery cells (20) are housed.

A hole may be formed in the bottom plate, the sidewalls, and/or the top plate (hereinafter, optionally referred to as the bottom plate or the like) of the module case. Such a hole may be formed on the bottom plate or the like which is in contact with a resin layer to be described below, and may be formed on the bottom plate or the like which is in contact with the resin layer at a contact area of 80% or more, as described below. The hole may be an injection hole for injecting a material (resin composition) for forming the resin layer when the resin layer is formed by an injection process, as described below. At this time, the shape, number and position of the hole can be adjusted in consideration of the injection efficiency of the material for forming the resin layer. In one example, the hole may be formed at least on the bottom plate.

In one example, the hole may be formed at about ¼ to ¾ point or about ⅜ to ⅞ point, or approximately the middle, of the total length of the sidewalls, the bottom plate, or the top plate. By injecting the resin composition through the injection hole formed at this point, the resin layer can be injected so as to have a wide contact area. Here, as shown in FIG. 3, ¼, ¾, ⅜, or ⅞ point is, for example, a ratio of the distance (A) to the hole forming position relative to the total length (L) measured based on any one end face (E) of the bottom plate or the like. The end (E) at which the length (L) and the distance (A) are formed may be any end (E) as long as the length (L) and the distance (A) are measured from the same end (E). In FIG. 3, the injection hole (50a) is in a form of being located at the approximately middle part of the bottom plate (10a).

The size and shape of the injection hole are not particularly limited, and can be formed in consideration of the injection efficiency of a resin layer material to be described below. For example, the hole may have a circular shape, an elliptical shape, a polygonal shape such as triangle or square, or an amorphous shape. The number and spacing of the injection hole are not greatly limited and can be adjusted so that the resin layer can have a wide contact area with the bottom plate or the like, as described above.

An observation hole (for example, 50b in FIG. 3) may be formed at the end of the bottom plate or the like where the injection hole is formed. For example, when the material of the resin layer is injected through the injection hole, such an observation hole may be for observing whether the injected material is injected well to the end of the sidewalls, the bottom plate, or the top plate. The position, shape, size, and number of the observation hole are not limited as long as they are formed so that it can be confirmed whether the injected material is properly injected.

The module case may be a thermally conductive case. The term thermally conductive case means a case in which the thermal conductivity of the entire case is 10 W/mk or more, or at least a portion having the thermal conductivity as above is included. For example, at least one of the sidewalls, the bottom plate and the top plate as described above may have the thermal conductivity described above. In another example, at least one of the sidewalls, the bottom plate, and the top plate may comprise a portion having the thermal conductivity. In another example, the thermal conductivity is 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or 195 W/mk or more. The higher the value of the thermal conductivity is, the more advantageous it is from the viewpoint of the heat dissipation property of the module, and the like, and the upper limit is not particularly limited. In one example, the thermal conductivity may be about 1,000 W/mk or less, 900 W/mk or less, 800 W/mk or less, 700 W/mk or less, 600 W/mk or less, 500 W/mk or less, 400 W/mk or less, 300 W/mk or less, or 250 W/mk or less, but is not limited thereto. The kind of materials exhibiting the thermal conductivity as above is not particularly limited, and for example, includes metal materials such as aluminum, gold, pure silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least a portion having the aforementioned thermal conductivity.

In the module case, the portion having a thermal conductivity in the above range may be a portion in contact with the resin layer and/or the insulating layer as described below. The portion having the thermal conductivity may be a portion in contact with a cooling medium such as cooling water. According to this structure, a structure capable of effectively discharging heat generated from the battery cell to the outside can be realized.

On the other hand, among physical properties mentioned in this specification, when the measured temperature affects the physical properties, the physical properties may be physical properties measured at room temperature, unless otherwise specified. The term room temperature herein may mean any one temperature within the range of about 10° C. to 30° C., for example, a temperature of about 25° C., about 23° C., or about 20° C. or so.

Also, the criteria for the liquid or solid phase, which is the state of the materials referred to herein, is also the room temperature. Thus, in this specification, a substance referred to as a liquid phase is a liquid phase at room temperature, and a substance referred to as a solid phase is a solid phase at room temperature.

The type of the battery cell housed in the module case is not particularly limited, and a variety of known battery cells may be applied. In one example, the battery cell may be a pouch type.

Referring to FIG. 4, the pouch type battery cell (100) may typically comprise an electrode assembly, an electrolyte, and a pouch exterior material.

FIG. 4 is an exploded perspective view schematically showing the configuration of an exemplary pouch type cell, and FIG. 5 is a combined perspective view of the configuration of FIG. 4.

The electrode assembly (110) included in the pouch type cell (100) may be in a form in which at least one positive plate and at least one negative plate are disposed with each separator interposed therebetween. The electrode assembly (110) may be a wound type in which one positive plate and one negative plate are wound together with the separator, or a stacked type in which a plurality of positive plates and a plurality of negative plates are laminated alternately with each separator interposed therebetween.

The pouch exterior material (120) may be configured in a form equipped with, for example, an outer insulating layer, a metal layer, and an inner adhesive layer. Such an exterior material (120) may comprise a metal thin film, such as aluminum, to protect inner elements such as the electrode assembly (110) and the electrolyte, to complement the electrochemical properties by the electrode assembly (110) and the electrolyte, and to consider heat dissipation or the like. Such a metal thin film may be interposed between insulating layers formed of an insulating material in order to ensure electrical insulation with elements such as the electrode assembly (110) and the electrolyte, or other elements outside the battery (100).

In one example, the exterior material (120) may comprise an upper pouch (121) and a lower pouch (122), where in at least one of the upper pouch (121) and the lower pouch (122), a concave internal space (I) can be formed. The electrode assembly (110) can be housed in the internal space (I) of this pouch. A sealing portion (S) is provided on each outer peripheral surface of the upper pouch (121) and the lower pouch (122) and these sealing portions (S) are bonded to each other so that the internal space accommodating the electrode assembly (110) can be sealed.

Each electrode plate of the electrode assembly (110) is provided with an electrode tab, and one or more electrode tabs may be connected to an electrode lead. The electrode lead may be interposed between the sealing portions (S) of the upper pouch (121) and the lower pouch (122) and exposed to the outside of the exterior material (120) to function as an electrode terminal of the secondary battery (100).

The shape of the pouch type cell is one example, and the battery cell applied in the present application is not limited to the above-described kind. In the present application, various shapes of known pouch type cells or other types of cells can be all applied as battery cells.

The battery module of the present application may further comprise a resin layer. In the present application, the term resin layer is a layer containing a resin component, and in one example, the resin layer may also be an adhesive layer. In one example, the battery module comprises the case and the battery cell, and may be in contact with any one of the sidewalls, the bottom plate, or the top plate of the case. At this time, the sidewalls, the bottom plate, or the top plate in contact with the resin layer may be the above-mentioned thermally conductive sidewall, bottom plate, or top plate. On the other hand, in the above description, the contact means thermal contact, which may mean a state that the resin layer is in direct contact with the bottom plate or the like, or other elements, for example, an insulating layer or the like as described below, between the resin layer and the bottom plate or the like are present, but the other element does not interfere with heat transfer from the resin layer to the bottom plate or the like. Here, the phrase "does not interfere with heat transfer" means the case that even when other elements (e.g., an insulating layer or a guiding portion as described below) exists between the resin layer and the bottom plate or the like, the total thermal conductivity of the other elements and the resin layer is about 1.5 W/mK or more, about 2 W/mK or more, 2.5 W/mK or more, 3 W/mK or more, 3.5 W/mK or more, or 4 W/mk or more, or the total thermal conductivity of the resin layer and the bottom plate or the like in contact therewith is included in the range even when the other elements are present. The thermal conductivity of the thermal contact may be 50 W/mk or less, 45 W/mk or less, 40 W/mk or less, 35 W/mk or less, 30 W/mk or less, 25 W/mk or less, 20 W/mk or less, 15 W/mk or less, 10 W/mk or less, 5 W/mk or less, 4.5 W/mk or less, or about 4.0 W/mk or less. This thermal contact can be achieved by controlling the thermal conductivity and/or the thickness of the other element when the other element is present.

The resin layer may be in contact with the bottom plate or the like, and may also be in contact with the battery cell. The contact between the battery cell and the resin layer is also the aforementioned thermal contact. By employing the above structure, the present application can realize the module in which more battery cells per unit volume are housed therein, while securing the heat dissipation characteristics as well as greatly reduces various fastening parts or module cooling equipments and the like conventionally required upon constructing a general battery module or a battery pack as an assembly of such modules. Accordingly, the present application can provide a battery module that is smaller, lighter, and has higher power.

FIGS. 6 and 7 are exemplary cross-sectional views of the battery module, and for example, the module may be in a form which comprises a case (10) including sidewalls (10b) and a bottom plate (10a); a plurality of battery cells (20) housed inside the case and a resin layer (30) in contact (thermal contact) with both the battery cell (20) and the case (10), as shown in FIGS. 6 and 7.

In the above structure, the bottom plate or the like in contact with the resin layer (30) may be the thermally conductive bottom plate or the like as described above.

The contact area between the resin layer and the bottom plate or the like may be about 70% or more, about 75% or more, about 80% or more, about 85% or more, about 90% or more, or about 95% or more, relative to the total area of the bottom plate or the like. The upper limit of the contact area is not particularly limited, and may be, for example, 100% or less, or less than about 100%.

When the bottom plate or the like includes a thermally conductive portion, the contact area may be a contact area for the thermally conductive portion, that is, a ratio over the total area of the thermally conductive portion.

As described above, the thermally conductive portion or the thermally conductive bottom plate or the like may be a portion in contact with a cooling medium such as cooling water. That is, as schematically shown in FIG. 6, the heat (H) can be easily discharged to the bottom plate or the like by the above structure, and heat release can be easily performed even in more simplified structures by contacting this bottom plate or the like with the cooling medium (CW).

The resin layer (30) may be in the form of a relatively thin layer as shown in FIG. 6, or may be filled in the internal space of the case (10) as shown in FIG. 7. In this case, the battery cell (20) may be present in a state inserted into the resin layer. In the case of the structure shown in FIG. 6, the thickness of the resin layer can be, for example, in the range of about 100 μm to 5 mm or in the range of about 200 μm to 5 mm. In the structure of the present application, if the resin layer is thin, it is advantageous in heat dissipation characteristics, and if it is thick, it is advantageous in insulating properties to be described below, so that the appropriate thickness can be set in consideration of this point. The thickness may be the thickness of the thinnest portion of the resin layer, the thickness of the thickest portion, or the average thickness.

As shown in FIG. 6 or 7, a guiding portion (10d) which can guide the housed battery cell (20) may also be present on at least one surface of the inside of the module case (10), for example, a surface (10a) in contact with the resin layer (30). At this time, the shape of the guiding portion (10d) is not particularly limited, and an appropriate shape can be employed in consideration of the shape of the battery cell to be applied, where the guiding portion (10d) may be integrally formed with the bottom plate or the like, or may be attached separately thereto. The guiding portion (10d) may be formed using a thermally conductive material, for example, a metallic material such as aluminum, gold, pure silver, tungsten, copper, nickel, or platinum in consideration of the above-described thermal contact. In addition, although not shown in the drawings, an interleaf or an adhesive layer may also be present between the housed battery cells (20). Here, the interleaf can act as a buffer upon charging and discharging the battery cell.

The resin layer or the battery module, to which the resin layer is applied, may have at least one or more physical properties out of physical properties to be described below. Each physical property to be described below is independent, and any one physical property does not give priority over other physical properties, and the resin layer can satisfy at least one or two or more physical properties as described below.

For example, the resin layer is a thermally conductive resin layer, which may have a thermal conductivity of about 1.5 W/mK or more, about 2 W/mK or more, 2.5 W/mK or more, about 3 W/mK or more, about 3.5 W/mK or more, or 4 W/mK or more. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate or the like to which the resin layer is attached may be a portion having the above-described thermal conductivity of 10 W/mK or more. At this time, the module case portion representing the thermal conductivity may be a part in contact with a cooling medium, for example, cooling water or the like. The thermal conductivity of the resin layer is, for example, a value measured according to ASTM D5470 Standard or ISO 22007-2 Standard. The method of setting the thermal conductivity of the resin layer in the above-mentioned range is not particularly limited. For example, the thermal conductivity of the resin layer can be controlled through the type of resin used in the resin layer and/or the use of fillers. For example, it is known that among resin components generally known to be usable as adhesives, acrylic resins, urethane resins, and silicone resins have similar heat conduction properties to one another, and epoxy resins have superior thermal conductivity to that of these resins, and olefin resins have higher thermal conductivity than that of the epoxy resins. Therefore, it is possible to select one having excellent thermal conductivity among the resins as needed. However, since the desired thermal conductivity is hardly ensured by only the resin components, it is also possible to apply a method in which filler components having excellent thermal conductivity are contained in the resin layer at an appropriate ratio, as described below.

In the battery module, the resin layer or the battery module, to which the resin layer is applied, may have a thermal resistance of 5 K/W or less, 4.5 K/W or less, 4 K/W or less, 3.5 K/W or less, 3 K/W or less, or about 2.8 K/W. When the resin layer or the battery module, to which the resin layer is applied, is adjusted in order to exhibit such a range of thermal resistance, excellent cooling efficiency or heat dissipation efficiency can be secured. The method of measuring the thermal resistance is not particularly limited. For example, it can be measured according to ASTM D5470 Standard or ISO 22007-2 Standard.

The resin layer can have a proper adhesive force in consideration of effective fixing of the battery cell, and impact resistance and vibration resistance in the process of using the module. In one example, the resin layer may have an adhesive force of about 1,000 gf/10 mm or less, about 950 gf/10 mm or less, about 900 gf/10 mm or less, about 850 gf/10 mm or less, about 800 gf/10 mm or less, about 750 gf/10 mm or less, about 700 gf/10 mm or less, about 650 gf/10 mm or less, or about 600 gf/10 mm or less. In another example, the resin layer may have an adhesive force of about 50 gf/10 mm or more, about 70 gf/10 mm or more, about 80 gf/10 mm or more, or about 90 gf/10 mm or more. The adhesive force may be a value measured at a peel rate of about 300 mm/min and a peel angle of 180 degrees. In addition, the adhesive force may be an adhesive force for the module case in contact with the resin layer. For example, when an insulating layer is formed between the bottom plate or the like in contact with the resin layer, and the resin layer, in the module case, as described below, the adhesive force for the module case may be an adhesive force for the module case in which the insulating layer is formed. If such an adhesive force can be secured, an excellent adhesive force can be exhibited for various materials such as a case or a battery cell included in a battery module. When the adhesive force in such a range is secured, excellent durability can be ensured by preventing volume changes upon charging and discharging of the battery cell in the battery module, operation temperature changes in the battery module or peeling due to hardening or shrinkage of the resin layer, and the like. Such an adhesive force can be ensured by, for example, constituting the resin layer as an adhesive layer. The adhesive force that a known adhesive material can exhibit is well known, and a material may be selected in consideration of such an adhesive force.

After a thermal shock test, for example, a thermal shock test, one cycle of which is composed of holding the battery module at a low temperature of −40° C. for 30 minutes, and then again holding it for 30 minutes after increasing the temperature to 80° C., that the cycle is repeated 100 times, it may be required for the resin layer to be formed such that the resin layer cannot be detached or peeled off from the module case or the battery cell of the battery module or cracks cannot be caused. For example, when the battery module is applied to a product, such as an automobile, requiring a long guarantee period (for example, about 15 years or more in the case of the automobile), performance may be required in the same level as above to ensure durability.

The resin layer may be an electrically insulating resin layer. In the structure described above, by exhibiting electrical insulation, the resin layer can maintain the performance of the battery module and secure stability. The electrically insulating resin layer may have an insulation breakdown voltage, as measured according to ASTM D149, of about 3 kV/mm or more, about 5 kV/mm or more, about 7 kV/mm or more, 10 kV/mm or more, 15 kV/mm or more, or 20 kV/mm or more. The higher the value of the insulation breakdown voltage is, the resin layer shows more excellent insulation, and thus the voltage is not particularly limited, but may be about 50 kV/mm or less, 45 kV/mm or less, 40 kV/mm or less, 35 kV/mm or less, or 30 kV/mm or less in consideration of composition of the resin layer or the like. The insulation breakdown voltage as above may also be controlled by controlling the insulating property of the resin component in the resin layer, and for example, the insulation breakdown voltage can be controlled by applying insulating fillers in the resin layer. In general, among the thermally conductive fillers, ceramic fillers as described below are known as a component capable of ensuring insulation.

As the resin layer, a flame retardant resin layer can be applied in consideration of stability. The term flame retardant resin layer in the present application may mean a resin layer showing a flame retardant property of V-0 or higher in UL 94 V Test (Vertical Burning Test). This can secure stability against fires and other accidents that may occur in the battery module.

The resin layer may have a specific gravity of 5 or less. In another example, the specific gravity may be 4.5 or less, 4 or less, 3.5 or less, or 3 or less. The resin layer showing the specific gravity in this range is advantageous for manufacturing a lightweight battery module. The lower the value of the specific gravity is, the more advantageous the lightening of the module is, and thus the lower limit is not particularly limited. For example, the specific gravity can be about 1.5 or more, or 2 or more. The components added to the resin layer can be adjusted so that the resin layer exhibits the specific gravity in the above range. For example, when thermally conductive fillers are added, a method of applying fillers capable of securing a desired thermal conductivity even at a low specific gravity, if possible, that is, fillers having a low specific gravity or surface-treated fillers, and the like may be used.

It is appropriate that the resin layer does not contain volatile substances, if possible. For example, the resin layer may have a ratio of non-volatile components of 90% by weight or more, 95% by weight or more, or 98% by weight or more. Here, the non-volatile components and the ratio thereof can be specified in the following manner. That is, the non-volatile content can be defined as the remaining portion after the resin layer is maintained at 100° C. for about 1 hour, and thus the ratio can be measured based on the initial weight of the resin layer and the ratio after the resin layer is maintained at 100° C. for about 1 hour.

Also, the resin layer may have excellent resistance to deterioration, if necessary, but it may be required to have stability that the surface of the module case or the battery cell is chemically unreactive, if possible.

It may be advantageous that the resin layer has also a low shrinkage ratio—during the process of curing or after curing. This can prevent the occurrence of peeling or voids that may occur during the manufacture or use process of the module. The shrinkage ratio can be appropriately adjusted within a range capable of exhibiting the above-mentioned effect, and can be, for example, less than 5%, less than 3% or less than about 1%. The lower the value of the shrinkage ratio is, the more advantageous the shrinkage ratio is, and thus the lower limit is not particularly limited.

It may be advantageous that the resin layer has also a low coefficient of thermal expansion (CTE). This can prevent the occurrence of peeling or voids that may occur during the manufacture or use process of the module. The coefficient of thermal expansion can be appropriately adjusted within a range capable of exhibiting the above-described effects, and can be, for example, less than 300 ppm/K, less than 250 ppm/K, less than 200 ppm/K, less than 150 ppm/K or less than about 100 ppm/K. The lower the value of the coefficient of thermal expansion is, the more advantageous the coefficient is, and thus the lower limit is not particularly limited.

The tensile strength of the resin layer can be appropriately adjusted, whereby excellent impact resistance and the like can be secured to provide a module showing appropriate durability. The tensile strength can be adjusted, for example, in the range of about 1.0 MPa or more.

The elongation of the resin layer can be appropriately adjusted, whereby excellent impact resistance and the like can be secured to provide a module showing appropriate durability. The elongation can be adjusted, for example, in the range of about 10% or more, or about 15% or more.

It may be advantageous that the resin layer also exhibits an appropriate hardness. For example, if the hardness of the resin layer is too high, the resin layer becomes excessively brittle, which may adversely affect reliability. Also, by controlling the hardness of the resin layer, the impact resistance and the vibration resistance can be secured, and the durability of the product can be ensured. The resin layer may have, for example, a hardness in Shore A type of less than 100, 99 or less, 98 or less, 95 or less, or 93 or less, or a hardness in Shore D type of less than about 80, about 70 or less, about 65 or less, or about 60 or less. The lower limit of the hardness is not particularly limited. For example, the hardness in Shore A type may be 60 or more, or the hardness in Shore 00 type may be 5 or more, or about 10 or more. The hardness of the resin layer usually depends on the type and the ratio of the fillers contained in the resin layer, and when an excessive amount of fillers is included, the hardness is usually increased. However, the resin component included in the resin layer also affects the hardness, as the silicone resins generally show a lower hardness than other resins such as epoxy or urethane.

The resin layer may also have a 5% weight loss temperature in a thermogravimetric analysis (TGA) of 400° C. or more, or an 800° C. balance may be 70% by weight or more. By such a characteristic, the battery module can have more improved stability at high temperature. In another example, the 800° C. balance may be about 75% by weight or more, about 80% by weight or more, about 85% by weight or more, or about 90% by weight or more. In another example, the 800° C. balance may be about 99% by weight or less. The thermogravimetric analysis (TGA) can be conducted within a range of 25° C. to 800° C. at a temperature raising rate of 20° C./minute under a nitrogen (N2) atmosphere of 60 cm3/minute. The thermogravimetric analysis (TGA) results can also be achieved by controlling the composition of the resin layer. For example, the 800° C. balance usually depends on the type or ratio of the fillers contained in the resin layer, and when an excess amount of the fillers is contained, the balance increases. However, since the silicone resins generally have higher heat resistance than other resins such as epoxy or urethane, the balance is higher, whereby the resin component included in the resin layer also affects the hardness.

As long as the battery cell can be effectively fixed and, if necessary, the above-mentioned physical properties can be imparted, the kind of the resin layer is not particularly limited, and all the known curable resin materials can be used.

The resin layer may be formed by curing a resin composition comprising a resin component basically, and therefore the resin layer or the resin composition may comprise a resin component. The usable resin component may include an acrylic resin, an epoxy resin, a urethane resin, an olefin resin, a urethane resin, an EVA (ethylene vinyl acetate) resin or a silicone resin, and the like, and thus the resin layer may comprise the resin. The resin layer may comprise the resin as a main component among resin components. That is, among the total resin components included in the resin layer, the acrylic resin, the epoxy resin, the urethane resin, the olefin resin, the urethane resin, the EVA (ethylene vinyl acetate) resin or the silicone resin, and the like may be included in an amount of about 70% or more, about 75% or more, about 80% or more, about 85% or about 90% or more on the basis of weight. The ratio may be about 99% or less or about 95% or less.

The material for forming the resin layer, that is, the resin composition may be an adhesive material as described above, and may be a solvent type, a water-based type or a solventless type, but the solventless type resin layer may be appropriate in consideration of convenience of the manufacturing process to be described below, and the like.

The resin layer material may be an active energy beam curing type, a moisture curing type, a thermosetting type, a room temperature curing type, or the like, and the room temperature curing type may also be appropriate in consideration of the convenience of the manufacturing process to be described below, and the like.

The resin layer may comprise the filler in consideration of the above-mentioned thermal conductivity, insulation, heat resistance (TGA analysis) or specific gravity, and the like. It is possible to secure the thermal conductivity and the like within the above-mentioned range by using suitable fillers. In one example, the filler may be thermally conductive fillers. In the present application, the term thermally conductive filler means a material having a thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the usable thermally conductive filler is not particularly limited, but ceramic fillers can be applied in consideration of insulation property and the like. For example, ceramic particles such as alumina, AlN (aluminum nitride), BN (boron nitride), silicon nitride, SiC or BeO may be used. In addition, if the insulating properties of the resin layer can be secured, application of carbon fillers such as graphite can be considered. The shape and ratio of the filler contained in the resin layer are not particularly limited and may be selected in consideration of viscosity of the resin composition, sedimentability in the resin layer, the desired heat resistance or thermal conductivity, insulating property, filling effect or dispersibility, and the like. Generally, the larger the size of the filler, the higher the viscosity of the resin composition and the higher the possibility that the filler precipitates in the resin layer. Also, the smaller the size, the higher the thermal resistance tends to be. Therefore, an appropriate type of filler may be selected in consideration of the above points, and two or more fillers may also be used, if necessary. In addition, it is advantageous to use spherical fillers in consideration of the filling amount, but fillers in the form of needles or plates can also be used in consideration of formation of networks or conductivity, and the like. In one example, the resin layer may comprise thermally conductive fillers having an average particle diameter within the range of 0.001 μm to 80 μm. In another example, the average particle diameter of the fillers may be 0.01 µm or more, 0.1 µm or more, 0.5 µm or more, 1 µm or more, 2 µm or more, 3 µm or more, 4 µm or more, 5 µm or more or about 6 µm or more. In another example, the average particle diameter of the fillers may be about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 5 µm or less.

The ratio of the filler contained in the resin layer can be selected in consideration of the characteristics of the resin layer so that the above-described characteristics, for example, thermal conductivity, insulation, and the like can be secured. For example, the filler may be contained in a range of about 50 parts by weight or more, relative to 100 parts by weight of the resin components of the resin layer. In another example, the part by weight of the filler may be about 100 parts by weight or more, about 150 parts by weight or more, about 200 parts by weight or more, about 250 parts by weight or more, about 300 parts by weight or more, about 350 parts by weight or more, about 400 parts by weight or more, about 500 parts by weight or more, about 550 parts by weight or more, about 600 parts by weight or more, about 650 parts by weight or more, or about 700 parts by weight or more. The upper limit of the proportion of the filler is not particularly limited and can be controlled within a range that can satisfy, for example, the thermal conductivity of the resin layer described above. In one example, the proportion of the filler may be about 2,000 parts by weight or less, 1,800 parts by weight or less, 1,600 parts by weight or less, 1,400 parts by weight or less, 1,200 parts by weight or less, 1,000 parts by weight or less, 950 parts by weight or less, or 900 parts by weight or less.

The resin layer or the resin composition may comprise a flame retardant to satisfy the above-mentioned flame retardance grade. The present inventors have found that the kind of the flame retardant should be selected so as to satisfy the above-mentioned flame retardance grade while exhibiting desired physical properties of the resin layer or the resin composition, and in one example, the ratio should be controlled. That is, a large amount of a flame retardant may be combined to the resin composition or the resin layer to simply impart flame retardance, but in such a case, the physical properties of the resin may be impaired. Particularly, in the case of the resin composition requiring thermal conductivity, requiring thixotropy for the injection process, and requiring rapid curing at room temperature, like the resin layer or the resin composition of the present application, it is a difficult problem to secure high flame retardance grade while satisfying the above physical properties.

The present inventors have confirmed through various checks that a phosphorus flame retardant should be applied to achieve the above object. Accordingly, the resin layer or the resin composition of the present application comprises a phosphorus flame retardant. As the phosphorus flame retardant, a mixture of a phosphorus flame retardant, which is liquid at room temperature, and a phosphorus flame retardant, which is solid at room temperature, can be used. The combination of these two specific flame retardants can ensure a high flame retardance grade without impairing thixotropy, thermal conductivity, and curability.

Here, the liquid phosphorus flame retardant may be a flame retardant, which exhibits a liquid phase at room temperature, having a melting point of less than room temperature, for example, less than about 30° C., less than 25° C., less than 20° C., less than 23° C., less than 15° C., less than 10° C. or less than 8° C. In addition, the solid phosphorus flame retardant may be a flame retardant, which exhibits a solid phase at room temperature, having a melting point of more than room temperature, for example, more than about 20° C., more than about 25° C., more than about 30° C., more than about 40° C. or more than about 50° C.

As the phosphorus flame retardant, various kinds may be used, and for example, as the liquid phosphorus flame retardant, a phosphate flame retardant such as resorcinol bis(diphenyl phosphate) may be applied. In addition, as the solid phosphorus flame retardant, a phosphinate flame retardant such as aluminum phosphinate may be used.

As the solid phosphorus flame retardant, a flame retardant in the form of powder may be used, and in this case, a powder type flame retardant having a particle diameter (D50) in a particle size distribution 50% within a range of about 1 µm to 10 µm can be used. In another example, the particle diameter (D50) may be about 2 µm or more, about 3 µm or more, about 4 µm or more, or about 4.5 µm or more, or may be about 9 µm or less, 8 µm or less, 7 µm or less, 6 µm or less, or 5.5 µm or less.

Through the combination of the above specific phosphorus flame retardants, it is possible to produce a resin layer or a resin composition which exhibits a high flame retardance grade while maintaining the desired physical properties.

In one example, the proportion of the flame retardant can be controlled. For example, the resin layer or the resin composition comprises a resin component, where the phosphorus flame retardant may be contained in a ratio of 20 to 40 parts by weight, relative to 100 parts by weight of the resin component. Here, the resin component includes a substance in a resin state and a substance which is brought into a resin state by curing. In another example, the proportion of the phosphorus flame retardant may be about 22 parts by weight or more, 24 parts by weight or more, 26 parts by weight or more, or 28 parts by weight or more, or may be 38 parts by weight or less, 36 parts by weight or less, 34 parts by weight or less, or 32 parts by weight or less or so.

In the above state, the ratio (A/B) of the weight (A) of the liquid phosphorus flame retardant and the weight (B) of the solid phosphorus flame retardant can be adjusted within a range of 0.5 to 1.5. In another example, the ratio (A/B) may be about 0.6 or more, 0.7 or more, 0.8 or more, 0.9 or more, or 0.95 or more, or may be 1.4 or less, 1.3 or less, 1.2 or less, 1.1 or less, or 1.05 or less.

The resin layer or the resin composition, having the desired physical properties, can be formed more efficiently under the above ratio. In order to achieve an appropriate effect, the resin layer or the resin composition may comprise as a flame retardant only a combination of phosphorus flame retardants, for example, the above-mentioned phosphorus flame retardants.

The resin layer may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

The resin layer may further comprise a flame retardant or a flame retardant aid agent, and the like. Such a resin layer can form a flame retardant resin layer. As the flame retardant, various known flame retardants can be applied without particular limitation, and for example, solid filler type flame retardants and liquid flame retardants can be applied. The flame retardant includes, for example, organic flame retardants such as melamine cyanurate and inorganic flame retardants such as magnesium hydroxide, but is not limited thereto.

When the amount of the filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame retardant synergist may also be added.

The resin layer may comprise any one or two or more of the above components.

In one example, the battery module may further comprise an insulating layer between the module case and the battery cell or between the resin layer and the module case. FIG. 8 is an example in which the insulating layer (40) is formed between the resin layer (30) and the guiding portion (10d) formed on the bottom plate (10c) of the case. By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, in the method of manufacturing a battery module as described below, a process of forming an insulating layer may be performed before the injection of the resin composition. A so-called TIM (Thermal Interface Material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, about 10 kV/mm or more, about 15 kV/mm or more, 20 kV/mm or more, 25 kV/mm or more, or 30 kV/mm or more. The higher the value of the insulation breakdown voltage is, the better the insulation shows, and thus it is not particularly limited. For example, the insulation breakdown voltage of the insulating layer may be about 100 kV/mm or less, 90 kV/mm or less, 80 kV/mm or less, 70 kV/mm or less, or 60 kV/mm or less. The thickness of the insulating layer can be set to an appropriate range in consideration of the insulating property and the thermal conductivity of the insulating layer, and the like, and for example, may be about 5 μm or more, 10 μm or more, 20 μm or more, 30 μm or more, 40 μm or more, 50 μm or more, 60 μm or more, 70 μm or more, 80 μm or more, or 90 μm or more or so. In addition, the upper limit of the thickness is not particularly limited and may be, for example, about 1 mm or less, about 200 μm or less, 190 μm or less, 180 μm or less, 170 μm or less, 160 μm or less, or 150 μm or less.

The present application also relates to a method for manufacturing a battery module, for example, the above-mentioned battery module.

The manufacturing method of the present application may comprise steps of injecting a resin composition into the above-described module case; housing a battery cell in the module case, and curing the resin composition to form the resin layer.

The order of the step of injecting the resin composition into the module case and the step of housing the battery cell in the module case is not particularly limited. For example, the resin composition may be first injected into the module case, followed by housing the battery cell in that state, or the battery cell may be first housed inside the module case, followed by injecting the resin composition therein.

In the present application, the term resin composition may mean the state of the resin layer before curing, and the term resin layer may mean the state of the resin layer after curing.

The method of injecting the resin composition into the module case is not particularly limited, and a known method can be applied. For example, a resin composition may be injected by pouring the resin composition into an opening of a module case, or a method of injecting a resin composition by the above-described injection port formed on a module case, a method of applying a resin composition to both a battery cell and a battery module, and the like may be applied. For proper fixing, the injection process may also be performed while constantly vibrating the battery module or the battery cell.

Here, the kind of the resin composition to be injected is not particularly limited, and a suitable resin composition, the kinds of which can exhibit desired physical properties, can be selected.

For example, the resin composition injected in the above may be a resin composition capable of satisfying the physical properties such as the above-mentioned thermal conductivity or forming a resin layer comprising the components therefor.

Such a resin composition may be the above-mentioned solvent type, water-based or solventless type resin composition, and suitably, may be a solventless type resin composition.

The resin composition may be an active energy beam curing type, moisture curing type, thermosetting type or room temperature curing type resin composition, and the like, and may be suitably a room temperature curing type resin composition.

The resin composition may be a resin composition comprising one or more of various additives such as the above-mentioned thermally conductive filler.

Such a resin composition may be prepared as one-component type, two-component type or three-component type, and the like.

The manner, in which the battery cell is housed in the module case into which the resin composition is injected or in the module case before the composition is injected, is not particularly limited.

The housing of the battery cells can be performed by arranging the battery cells at suitable positions in the module case in consideration of the desired arrangement and the like. In addition, when the cartridge structure is present, the step can be performed by placing the battery cells at proper positions of the cartridge structure, or inserting the cartridge structure, in which the battery cells are located, into the module case.

After the battery cells are housed therein, adhesion between the battery cells or adhesion between the battery cells and the module case can be achieved by curing the injected resin composition. The manner of curing the resin composition is not particularly limited.

For example, the step can be performed by a method of irradiating the resin composition with an active energy beam such as ultraviolet ray in the case where the resin composition is an active energy beam curing type; by a method of maintaining the resin composition under an appropriate moisture in the case where it is a moisture curing type; by a method of applying an appropriate heat to the resin composition in the case where it is a thermosetting type; or by a method of maintaining the resin composition at room temperature, and the like in the case where it is a room temperature curing type.

In addition, heat may also be applied for a short time, for example, so as to be about 40° C. to 50° C. or so, under conditions without affecting stability of the battery cell in terms of takt time and processability before or during the curing process, or before or during the housing process of the battery cells.

The present application also relates to a resin composition which can be used in the manufacturing method or for forming the battery module of the above-mentioned structure.

As described above, the resin composition is not particularly limited as long as it allows for effectively fixing the battery cells to the module case and can impart the above-mentioned physical properties, if necessary, and any known resin composition can be used.

Such a resin composition may include, but is not limited to, an acrylic resin composition, an epoxy resin composition, a urethane resin composition, an olefin resin composition, a urethane resin composition, an EVA (ethylene vinyl acetate) resin composition or a silicone resin composition, and the like.

The resin composition may be a solvent type resin composition, a water-based resin composition, or a solventless type resin composition, and may suitably be a solventless type resin composition.

The resin composition may be an active energy beam curing type resin composition, a moisture curing type resin composition, a thermosetting type resin composition or a room temperature curing type resin composition, and the like, and may be suitably a room temperature curing type resin composition.

For example, a resin composition prepared by adding an additive, such as the above-described filler, in an appropriate amount to a resin composition capable of forming a known acrylic adhesive, epoxy adhesive, urethane adhesive, olefin adhesive, EVA (ethylene vinyl acetate) adhesive or silicone adhesive, in consideration of the desired physical properties can be applied to the above-mentioned method.

The resin composition as above may comprise a radical initiator and a catalyst therefor in consideration of room temperature curability and the like. For example, the resin composition may comprise an acyl peroxide initiator such as benzoyl peroxide, and a catalyst for the initiator, such as a toluidine compound, whereby a suitable curing system may be implemented.

The resin composition may further comprise various components, as needed, in addition to the above components.

The present application also relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, where all applications requiring secondary batteries as power may be included. For example, a method of configuring the automobile using the battery module or the battery pack is not particularly limited, and a general method can be applied.

Advantageous Effects

The present application can provide a battery module having excellent power relative to volume and excellent heat dissipation characteristics, and the like, while being manufactured in a simple process and at a low cost, a manufacturing method thereof, and a resin composition applied to the manufacturing method.

BRIEF DESCRIPTION OF DRAWINGS

FIG. 1 is a view showing an exemplary module case that may be applied in the present application.

FIG. 2 is a view showing a form in which battery cells are housed in a module case.

FIG. 3 is a view of an exemplary bottom plate in which injection holes and observation holes are formed.

FIGS. 4 and 5 are views showing an exemplary battery pouch that may be used as a battery cell.

FIGS. 6 to 8 are views showing the structure of an exemplary battery module.

EXPLANATION OF REFERENCE NUMERALS AND SYMBOLS

10: module case
10a: bottom plate
10b: sidewall
10c: top plate
10d: guiding portion
20: battery cell
30: resin layer
50a: injection hole
50b: observation hole
40: insulating layer
100: pouch type cell
110: electrode assembly
120: exterior material
121: upper pouch
122: lower pouch
S: sealing portion Mode for Invention Hereinafter, the battery module of the present application will be described through examples and comparative examples, but the scope of the present application is not limited by the scope as set forth below.

Evaluation Method of Thermal Conductivity of Resin Layer

The thermal conductivity of the resin layer was measured according to ASTM D5470 Standard. That is, after placing the resin layer between two copper bars according to ASTM D 5470 Standard, one of the two copper bars is brought into contact with a heater and the other is brought into contact with a cooler, and then the heater was maintained at a constant temperature, and the capacity of the cooler was adjusted to make a thermal equilibrium state (a state showing temperature change of about 0.1° C. or less in 5 minutes). The temperature of each copper rod was measured in the thermal equilibrium state, and the thermal conductivity (K, unit: W/mk) was evaluated according to the following equation. Upon evaluating the thermal conductivity, the pressure applied to the resin layer was adjusted to be about 11 Kg/25 cm2 or so, and the thermal conductivity was calculated based on the final thickness when the thickness of the resin layer was changed during the measurement process.

$$K=(Q \times dx)/(A \times dT) \quad \text{<Thermal Conductivity Equation>}$$

In Equation above, K is a thermal conductivity (W/mK), Q is a heat (unit: W) moved per unit time, dx is a thickness (unit: m) of the resin layer, A is a cross sectional area (unit: m2) of the resin layer, and dT is a temperature difference (unit: K) of the copper bar.

2. Evaluation Method of Flame Retardance

The flame retardance grade of the resin layer was identified according to UL 94V test method of UL plastic test method. First, the resin composition prepared in the following example was cured to a thickness of about 2 to 3 mm and a width and a length of 125 mm and 13 mm, respectively, to prepare a bar-shaped specimen.

Subsequently, a 20 mm-long flame is ignited to the specimen for 10 seconds, and the burning time (t1) and burning pattern of the specimen are checked (primary flame ignition). Subsequently, when the combustion is completed after the primary flame ignition, the burning time (t2) and the glowing time (t3) of the specimen are measured after again igniting flame for 10 seconds, and the combustion aspect is recorded. The times (t1, t2, t3) and the combustion aspect (whether or not the cotton wool is ignited by dripping, whether or not it is burned until the clamp, etc.) are determined and grades are calculated according to the following criteria.

<Flame Retardance Grade>

V0 grade: when the individual burning time (t1 or t2) is 10 seconds or less, the total burning time (sum of t1+t2 for 5 specimens) by pretreatment condition is 50 seconds or less, the burning time and the glowing time after secondary flame ignition are 30 seconds or less, there is no combustion up to the clamp (125 mm mark), and there is also no ignition of the cotton wool by dripping V1 Grade: when the individual burning time (t1 or t2) is more than 10 seconds and 30 seconds or less, the total burning time (sum of t1+t2 for 5 specimens) by pretreatment condition is more than 50 seconds and 250 seconds or less, the burning time and the glowing time after secondary flame ignition are more than 30 seconds and 60 seconds or less, there is no combustion up to the clamp (125 mm mark), and there is also no ignition of the cotton wool by dripping V2 grade: when the individual burning time (t1 or t2) is more than 10 seconds and 30 seconds or less, the total burning time (sum of t1+t2 for 5 specimens) by pretreatment condition is more than 50 seconds and 250 seconds or less, the burning time and the glowing time after secondary flame ignition are more than 30 seconds and 60 seconds or less, there is no combustion up to the clamp (125 mm mark), and there is ignition of the cotton wool by dripping 3. Flowability (Thixotropy) Evaluation Method The thixotropy was evaluated by loading the resin composition on a PET (poly(ethylene terephthalate)) film to a thickness of about 30 mm, then vertically standing the loaded film for 1 hour and measuring the distance that the resin composition flowed down. When the flowed-down distance of the resin composition was 50 mm or more, it was evaluated that there was no thixotropy and the flow was confirmed, and when it was less than 50 mm, it was determined that the thixotropy was confirmed.

Example 1

Preparation of Resin Composition

A two-component type urethane adhesive composition (main agent: HP-3753 (KPX Chemical), hardener: TLA-100 (Asahi Kasei)) was mixed with alumina (particle size distribution: 1 µm to 60 µm) in such an amount that the two-component type urethane adhesive composition could exhibit a thermal conductivity after curing of about 3 W/mK in a state where no flame retardant was formulated (in a range of about 600 to 900 parts by weight relative to 100 parts by weight of the sum of the two-component resin components). Subsequently, about 15 parts by weight of resorcinol bis(diphenylphosphate) and about 15 parts by weight of aluminum phosphinate were further formulated, relative to 100 parts by weight of the sum of the two-component resin components in the adhesive composition, to prepare a resin composition. Here, resorcinol bis(diphenylphosphate) is a liquid phosphorus flame retardant having a phosphorus (P) content of about 10 to 12%, and aluminum phosphinate is a solid flame retardant having a phosphorus (P) content of about 23 to 24%, which is a solid phosphorus flame retardant having a particle diameter (D50) in a particle size distribution 50% of about 5 µm and a decomposition temperature of about 350° C.

Manufacture of Battery Module

As a module case having the same shape as FIG. 1, a module case having a bottom plate, sidewalls, and a top plate, made of aluminum, was used. Guiding portions for guiding installation of battery cells were formed on the internal surface of the bottom plate in the module case, injection holes for injecting the resin composition were formed at regular intervals in the central part of the bottom plate in the module case, and observation holes were formed at the end of the bottom plate. A bundle of pouches laminating a plurality of battery pouches was housed in the module case. Subsequently, a top plate was covered on the upper surface of the module case. Thereafter, the prepared resin composition was injected into the injection hole until it was confirmed that the composition to be injected had reached the observation hole, and then cured to manufacture a battery module.

Comparative Example 1

A battery module was manufactured in the same manner as in Example 1, except that the flame retardant was not mixed upon preparing the resin composition.

Comparative Example 2

A battery module was manufactured in the same manner as in Example 1, except that only resorcinol bis(diphenylphosphate) was mixed as the flame retardant upon preparing the resin composition in an amount of about 30 parts by weight, relative to 100 parts by weight of the sum of the two-component resin components.

Comparative Example 3

A battery module was manufactured in the same manner as in Example 1, except that only chloroalkyl diphosphonate ester (C13H24Cl6O8P2) was mixed as the flame retardant upon preparing the resin composition in an amount of about 30 parts by weight, relative to 100 parts by weight of the sum of the two-component resin components. The chloroalkyl diphosphonate ester (C13H24CL6O8P2) is a solid flame retardant having a particle diameter (D50) in a particle size distribution 50% of about 10 µm and a decomposition temperature of more than about 280° C.

Comparative Example 4

A battery module was manufactured in the same manner as in Example 1, except that only aluminum phosphinate was mixed as the flame retardant upon preparing the resin composition in an amount of about 30 parts by weight, relative to 100 parts by weight of the sum of the two-component resin components.

Comparative Example 5

A battery module was manufactured in the same manner as in Example 1, except that only an aluminum polyphosphate flame retardant was mixed as the flame retardant upon preparing the resin composition in an amount of about 30 parts by weight, relative to 100 parts by weight of the sum of the two-component resin components. The aluminum polyphosphate flame retardant is a solid flame retardant having a particle diameter (D50) in a particle size distribution 50% of about 18 µm and a decomposition temperature of more than about 275° C.

Comparative Example 6

A battery module was manufactured in the same manner as in Example 1, except that only a thermoplastic elastomer (ether-ester) type flame retardant was mixed as the flame retardant upon preparing the resin composition in an amount of about 30 parts by weight, relative to 100 parts by weight of the sum of the two-component resin components. The flame retardant is a solid flame retardant having a particle diameter (D50) in a particle size distribution 50% of about 10 µm and a decomposition temperature of more than about 280° C.

Comparative Example 7

A battery module was manufactured in the same manner as in Example 1, except that the compounding ratio of the resorcinol bis(diphenylphosphate) flame retardant was changed to 10 parts by weight and the compounding ratio of the aluminum phosphinate flame retardant was changed to 10 parts by weight upon preparing the resin composition.

Comparative Example 8

A battery module was manufactured in the same manner as in Example 1, except that 15 parts by weight of the resorcinol bis(diphenylphosphate) flame retardant and 15 parts by weight of the aluminum polyphosphate flame retardant were formulated upon preparing the resin composition.

Comparative Example 9

A battery module was manufactured in the same manner as in Example 1, except that 15 parts by weight of the resorcinol bis(diphenylphosphate) flame retardant and 15 parts by weight of the flame retardant of Comparative Example 6 were formulated upon preparing the resin composition.

The physical properties of the resin compositions applied in Examples and Comparative Examples above were summarized and described in Table 1 below.

[Table 1]

TABLE 1

|  | Thermal Conductivity (unit: W/mK) | Thixotropy | Flame Retardance Grade |
| --- | --- | --- | --- |
| Example 1 | 3.03 | confirmed thixotropy | V0 |
| Comparative Example 1 | 3.05 | flowed-down | V1 |
| Comparative Example 2 | 2.91 | flowed-down | V1 |
| Comparative Example 3 | 3.04 | confirmed thixotropy | V1 |
| Comparative Example 4 | 2.57 | confirmed thixotropy | V1 |
| Comparative Example 5 | 3.25 | flowed-down | V2 |
| Comparative Example 6 | 3.14 | flowed-down | V1 |
| Comparative Example 7 | 3.01 | confirmed thixotropy | V2 |
| Comparative Example 8 | 3.01 | flowed-down | V2 |
| Comparative Example 9 | 2.96 | flowed-down | V1 |

From the results, it can be seen that in Example 1 only, the resin composition satisfying the flame retardance grade V0, while having thixotropy and showing high thermal conductivity, has been prepared. In the case of Comparative Example 1, the flame retardance grade was lowered by adding no flame retardant, and the resin composition did not show thixotropy. In Comparative Example 2, thixotropy was not confirmed and thermal conductivity was lowered even though the same amount of filler was compounded, and in Comparative Examples 3 and 4, thixotropy was confirmed, but high thermal conductivity and flame retardance grade were not satisfied at the same time. In Comparative Examples 5, 6, 8 and 9, thixotropy was not secured and high thermal conductivity and flame retardance grade were not satisfied at the same time, and in Comparative Example 7, thixotropy was confirmed, but high thermal conductivity and flame retardance grade were not satisfied at the same time.

The invention claimed is:
1. A method of manufacturing a battery module, comprising:
   injecting a resin composition into a module case, wherein the module case has a bottom plate and sidewalls forming an internal space;
   housing a plurality of battery cells; and
   curing the resin composition to form a resin layer,
   wherein the resin composition is injected into the module case such that it forms the resin layer that is in contact with the plurality of the battery cells and also in contact with the bottom plate,
   wherein the bottom plate has an injection hole for injecting the resin composition into the module case, wherein the resin composition is injected through the injection hole after housing the plurality of battery cells in the internal space, wherein the bottom plate has an observation hole for observing the resin composition injected into the module case, wherein the injection hole is formed at ¼ to ¾ point of a total length of the bottom plate and the observation hole is formed at the end of the bottom plate, and wherein the resin composition is injected into the module case through the injection hole after housing the plurality of battery cells in the internal space until the resin composition reaches the observation hole.

2. The method of claim 1, wherein the resin layer is an adhesive layer.

3. The method of claim 2, wherein the resin layer has an adhesive force of about 50 gf/10 mm to 1,000 gf/10 mm measured at a peel rate of about 300 mm/min and a peel angel of 180 degrees.

4. The method of claim 1, wherein the injecting is performed while vibrating the battery module or the battery cell.

5. The method of claim 1, wherein the resin layer has a thermal conductivity of 1.5 W/mK or more.

6. The method of claim 1, wherein the bottom plate in contact with the resin layer comprises a thermally conductive region.

7. The method of claim 6, wherein the contact ratio of the resin layer and the thermally conductive region is 80% or more, relative to the total area of the thermally conductive region.

8. The method of claim 1, wherein the side walls in contact with the resin layer comprises a thermally conductive region.

9. The method of claim 8, wherein the contact ratio of the resin layer and the thermally conductive region is 80% or more, relative to the total area of the thermally conductive region.

10. The method of claim 1, wherein the resin layer comprises a phosphorous flame retardant.

11. The method of claim 10, wherein the resin layer comprises resin components and the phosphorus flame retardant is contained in a ratio of 20 to 40 parts by weight, relative to 100 parts by weight of the resin components.

12. The method of claim 1, wherein the resin layer comprises an acrylic resin, an epoxy resin, a urethane resin, an olefin resin, an EVA resin, or a silicone resin.

13. The method of claim 1, wherein the resin layer comprises a filler.

14. The method of claim 13, wherein the filler is ceramic particles or carbonaceous fillers.

15. The method of claim 5, wherein the battery cells are pouch-type battery cells.

* * * * *